United States Patent
Liu et al.

(10) Patent No.: US 10,992,813 B1
(45) Date of Patent: *Apr. 27, 2021

(54) ROUTING OF CALLS BASED ON ANALYSIS OF DIGITAL VOICE DATA IN A DATA-COMMUNICATIONS SERVER SYSTEM

(71) Applicant: 8x8, Inc., Campbell, CA (US)

(72) Inventors: Zhishen Liu, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,148

(22) Filed: Jul. 31, 2020

Related U.S. Application Data

(63) Continuation of application No. 16/288,386, filed on Feb. 28, 2019, now Pat. No. 10,735,592.

(60) Provisional application No. 62/650,652, filed on Mar. 30, 2018.

(51) Int. Cl.
| | |
|---|---|
| *H04M 3/523* | (2006.01) |
| *H04M 3/51* | (2006.01) |
| *G06F 16/9537* | (2019.01) |
| *G06F 16/683* | (2019.01) |
| *G10L 15/18* | (2013.01) |
| *G10L 15/26* | (2006.01) |
| *H04L 29/08* | (2006.01) |

(52) U.S. Cl.
CPC ........ *H04M 3/5233* (2013.01); *G06F 16/685* (2019.01); *G06F 16/9537* (2019.01); *G10L 15/1807* (2013.01); *G10L 15/26* (2013.01); *H04L 67/306* (2013.01); *H04M 3/5175* (2013.01); *H04M 3/5183* (2013.01); *H04M 3/5238* (2013.01)

(58) Field of Classification Search
None
See application file for complete search history.

(56) References Cited

U.S. PATENT DOCUMENTS

| | | |
|---|---|---|
| 5,473,732 A | 12/1995 | Chang |
| 6,424,935 B1 | 7/2002 | Taylor |
| 7,236,932 B1 | 6/2007 | Grajski |
| 9,203,652 B2 | 12/2015 | Petit-Huguenin et al. |
| 2004/0143559 A1 | 7/2004 | Ayala |

(Continued)

*Primary Examiner* — Nafiz E Hoque
(74) *Attorney, Agent, or Firm* — Crawford Maunu PLLC

(57) ABSTRACT

Certain aspects of the disclosure are directed to apparatuses and methods involving a data-communication apparatus that includes a data-communications server and processing circuitry in communication therewith. The data-communication server interfaces with a plurality of remotely-situated client entities for providing data communication services. The processing circuitry accesses an archive of digital voice data indicative of transcribed audio conversations for at least one of the plurality of remotely-situated client entities, calendar information, and a client data-communications server for geographic information of the agents and system parameters. The processing circuitry analyzes the digital voice data associated with the agents, the calendar information, and the system parameters to predict a call answer rate for agents of a geographic region of the at least one remotely-situated client entity for a period of time and reroutes incoming calls based on the predicted call answer rate.

28 Claims, 4 Drawing Sheets

(56) References Cited

U.S. PATENT DOCUMENTS

2006/0235740 A1* 10/2006 Lea .................. G06Q 10/06
                                                     705/7.21
2009/0276215 A1   11/2009 Hager
2015/0281448 A1* 10/2015 Putra ................ G06Q 10/067
                                                     379/265.03

* cited by examiner

ROUTING OF CALLS BASED ON ANALYSIS OF DIGITAL VOICE DATA IN A DATA-COMMUNICATIONS SERVER SYSTEM

OVERVIEW

Aspects of various embodiments are directed to capturing and analyzing digital voice data in a data-communication server system such as a broadband server and/or a Voice over Internet Protocol (VoIP) system, which is used to identify an outcome of a conversation based on a tone/sentiment and/or keywords. In the following discussion, various implementations and applications are disclosed to provide an understanding of the instant disclosure by way of non-limiting example embodiments exemplified by way of VoIP-type data communications which typically involve a data-communication server communicating with an endpoint device, such as a VoIP-enabled endpoint device ("VoIP device") via a broadband network (e.g., Internet, WiFi, cellular) to connect with the data-communication server that is managed by an VoIP provider such as 8×8, Inc. and/or an Internet Service Provider (ISP) such as Yahoo or Google. Through such a server, call routing and other data communications services are managed for the endpoint device.

Computer servers are increasingly being used to provide various services over a network including, but not limited to, VoIP communications services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services being made available. This growth can be attributable to any of a wide variety of socio-economic changes such as the mobility of users of these services, the types and reduced costs of portable telecommunication tools, and the ever-evolving technology adapting to the personal and business needs of the telecommunications users.

SUMMARY

Various example embodiments are directed to issues such as those addressed above and/or others which may become apparent from the following disclosure concerning routing of voice calls and other services based on analysis of digital voice data in a data-communications system.

A number of aspects are directed to a data-communications system that includes a data-communication server that interfaces with a plurality of remotely-situated client entities to provide data communication services and processing circuitry coupled to a memory circuit and to the data-communication server. The data-communications server is operated by a telecommunications provider, where the data-communications server on the data communication provider side (e.g., a VoIP provider server as commercially available services from 8×8, Inc.), is used to provide data-communication services to a multitude of client entities. The processing circuit, which can be part of or separate from the data-communication server, is in communication with the data-communications server and can analyze digital voice data that represents audio (e.g., spoken) conversations between agents of the client entities and other personnel, such as customers. For example, the processing circuitry can receive digital voice data indicative of transcribed audio conversations between a plurality of agents and customers of a remotely-situated client entity and identify keywords and speech characteristic parameters from the digital voice data and which are from the data communication services provided by the data-communications server. The speech characteristic parameters are indicative of a tone or sentiment of the transcribed audio conversations. Example speech characteristic parameters include a frequency of audio of the transcribed audio conversation, wavelength or velocity of the audio, amplitude of the audio, and a combination thereof.

The processing circuitry can provide associations of at least one of the keywords and speech characteristic parameters with outcomes of the transcribed audio conversations, and provide the associations to a client data-communications server as feedback for the outcomes of the transcribed audio conversations with the customer(s). The associations can indicate which keywords and speech characteristics have a greater probability of a negative or positive outcome, which can be defined by the entity. Each entity and/or different divisions of an entity can have different negative and positive outcomes. Example outcomes can include a sale to a customer, a renewal of a service, a discontinuation of service, resolving of an issue, not resolving an issue, and customer hang up, among other outcomes. Other example outcomes can include a change in tone or sentiment of the customer during the conversation, such as a customer that starts the conversation angry or upset and ends the conversation happy. The associations can be stored in a database as an archive that is accessible and that ties the keywords with dates of the conversations and the speech characteristic parameters of the particular transcribed audio conversations. In various specific aspects, the processing circuitry can adjust the associations over time based on further analysis of digital voice data and provide the adjustments as feedback.

The outcomes can be determined based on keywords in the digital voice data. For example, the processing circuitry, which can form part of the data-communications server or be separate therefrom (such as forming part of a client server), can identify the outcome based on the keywords. Alternatively and/or in addition, metadata can be located in the digital voice data that can be used to determine the outcome. In some instances, an agent can insert the metadata during the conversation and which can be tied to the digital voice data of the conversation and provided to the processing circuitry by the data-communications server. In various specific aspects, the association of the keywords and speech characteristic parameters can be provided to the agent associated with the audio conversation via a graphical user interface that is accessible to the agent. The associations can be adjusted in response to the agent providing an input indicating the association is incorrect. Similarly, the association can be stored in response to the agent providing an input indicating the association is correct or not providing an input within a threshold amount of time. In some specific aspects, the associations can be locked and a manager reviews the recommended adjustments (by the agent) and approves or denies the adjustment.

In a number of specific aspects, the analysis can be based on or further correlated with different classifications. The different classification can be based on characteristics of the audio conversation, the agents, and/or the customer, such as geographic region of the customer, sex of the customer, age of the customer, type of customer, and a combination thereof. As previously described, the associations are stored in a database as an archive. The database can be used to identify keywords and phrases to avoid for particular types of customers and keywords and phrases to use for the particular types of customers.

A number of more-specific aspects are directed to an apparatus including a data-communications server that interfaces with a plurality of remotely-situated client entities to provide data communications services and processing circuitry coupled to a memory circuit and in communication with the data-communications server. The processing circuitry accesses: an archive of digital voice data indicative of transcribed audio conversations between a plurality of agents and customers for at least one of the plurality of remotely-situated client entities, the archived digital voice data including keywords and speech characteristic parameters associated with outcomes of the transcribed audio conversations; calendar information for agents of the at least one of the plurality of remotely-situated client entities; and a client server for geographic information of the agents and system parameters of the at least one remotely-situated client entity. The processing circuitry can analyze the digital voice data associated with the agents of the remotely-situated client entity, the calendar information, and the system parameters to predict a call answer rate for particular agents of a geographic region of the at least one remotely-situated client entity for a period of time and reroute incoming calls for the at least one remotely-situated client entity based on the predicted call answer rate.

The processing circuitry can predict the call answer rate for particular agents of the geographic location to be below a threshold responsive to at least one of: identifying greater than a threshold number of agents are out of the office for the period of time; trigger words in the archived digital voice data indicative of illness, weather, catastrophes associated with the geographic region and the period of time; and system parameters indicating schedule outages or system updates for the period of time. More specifically, the processing circuitry can predict the call answer rate for particular agents by weighting each of the information identified from the archived digital voice data, the calendar information, and the system parameters.

The processing circuitry and data-communications server can reroute the incoming calls by providing an indication of the rerouting to an identified personnel of the client entity as identified from the client server and rerouting in response to verification received from the identified personnel. The data-communications server can reroute an increasing number of incoming calls to the geographic region in response to the prediction by the processing circuitry. In various specific aspects, feedback can be provided to an identified personnel responsive to the rerouting, the feedback including a service provided by the data-communications server that increases a call rate of the geographic region.

In a number of aspects, the processing circuitry can analyze the archive of digital voice data indicative of transcribed audio conversations between the plurality of agents and customers to identify keywords and speech characteristic parameters associated with the customers and the outcomes of the transcribed audio conversations and predict the call answer rate for particular agents of the geographic region based on identified keywords and outcomes of the transcribed audio calls associated with the particular agents. A weight can be provided to each of the identified information and sum the weights, wherein a respective summed weights outside a threshold indicates rerouting of calls for the respective geographic region.

A number of embodiments are directed to methods involving use of such an example apparatus and/or data-communications system. A method can include accessing, via processing circuitry in communication with a data-communications server that provides data communication services (as described above): an archive of digital voice data indicative of transcribed audio conversations between a plurality of agents and customers for at least one of the plurality of remotely-situated client entities, the archived digital voice data including keywords and speech characteristic parameters associated with outcomes of the transcribed audio conversations; calendar information for agents of the at least one remotely-situated client entity; and a client server for geographic information of the agents and system parameters of the at least one remotely-situated client entity. The method can further include analyzing the digital voice data associated with the agents of the remotely-situated client entity, the calendar information, and the system parameters. Based on the analysis, the method includes predicting a call answer rate for particular agents of a geographic region of the remotely-situated client entity for a period of time and rerouting incoming calls for the remotely-situated client entity based on the predicted call answer rate.

Predicting the call answer rate for particular agents of the geographic region can be based on identified keywords and outcomes of the transcribed audio calls associated with the particular agents. For example, a weight can be provided to information accessed from the archive, the calendar information, the client data-communications server, and the weights can be summed, wherein a respective summed weights outside a threshold indicates rerouting of calls for the respective geographic region. The method can further include rerouting an increasing number of incoming calls to the geographic region in response to the prediction and/or providing information indicative of the rerouting to an identified personnel of the client entity as identified from the client server.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the drawings included in the attached Appendices and the accompanying drawings, in which.

Figure 1:
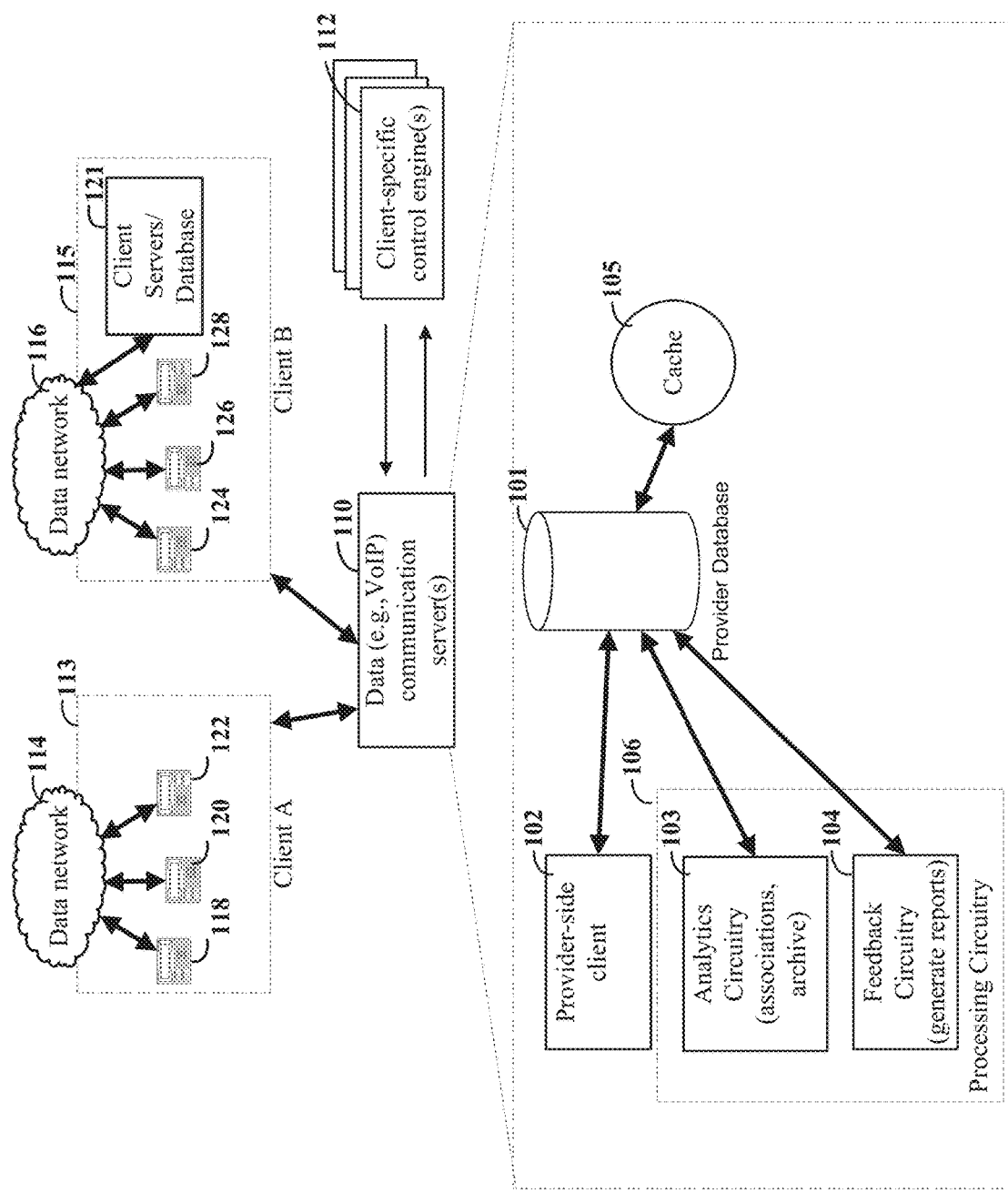
FIG. 1 illustrates an example data-communications system, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving analysis of digital voice data in a data-communication system. In certain implementations, aspects of the present disclosure have been shown to be beneficial when used in a Voice over Internet Protocol (VoIP) system including a VoIP communications server that interfaces with a plurality of remote-situation client entities. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

Users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client, such as a Virtual Contact Center (VCC) web client, and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communication services provided by the data-communications server. The analysis can include identifying keywords and speech characteristic parameters from the digital voice data, which can be, alone or together, indicative of a tone or a sentiment of a conversation (e.g., is the conversation going well or not). Example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The processing circuitry and/or data-communications server can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call can adjust over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

In various embodiments, the processing circuitry and/or data-communications server can be used to make routing decisions based on data across a variety of platforms. The routing decisions, in some specific embodiments, are based on a predicted inability to hander a volume of incoming calls. The decision can be made based on data obtained from endpoint devices of agents, data-communications server operated by the provider, and data-communications server operated by the client. More specifically, the prediction can be based on geography, system updates, schedules and keywords, and which include unification between platforms of the data-communication system to provide better routing decisions. In a number of embodiments, the call traffic can be rerouted based on analysis of digital voice data. The unification can include the use of Outlook on the agent's endpoint devices to identify schedules, data from the client data-communication server to identify scheduled system updates and/or other system level issues, digital voice data analyzed to identify when or where to reroute traffic, and other data (e.g., data obtained from a query of website or the Internet). The digital voice data may be used to identify an agent that is leaving when not scheduled to, or that may be otherwise unable to take telephone calls. As an example, one or more agents may unexpectantly be unable to answer phone calls due to illness, weather or other catastrophes of the geographic region, family issues, unplanned work meetings, among other reasons. Such situations may be identified based on keywords and may be associated with being out of the office or unable to answer calls (as an outcome in the archive). In addition to using the digital voice data to predict volume of calls that can be handled, the digital voice data can be used to make decisions of where to reroute the calls to.

Turning now to the figures, FIG. 1 illustrates an example of a data-communications system, consistent with embodiments of the present disclosure. As illustrated in FIG. 1, the data-communications system includes a data-communications server 110 configured to provide data communication services, including data communications such as VoIP calls, for a plurality of endpoint devices 118, 120, 122, 124, 126, 128 connected in one or more data networks 114, 116. In specific embodiments, the data-communications server 110 is a VoIP communications server that provides VoIP communications. Although FIG. 1 illustrates two data networks 114, 116 communicatively coupled to the data-communications server 110, examples are not so limited and the data-communications server 110 can be communicatively coupled to three or more data networks. Various specific embodiments are herein directed to an apparatus that includes the data-communications server 110 and processing circuitry 106.

The endpoint devices are circuit-based instruments that are used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device is respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with the present disclosure. One or more of the clients can have client servers and/or databases 121 used to implement a variety of different services.

The system can include one or more processing circuits configured to implement client-specific control engines 112, which are configured to adjust the data-communications provided for each client account according to a respective set of control directives. For instance, the client-specific control engines 112 can adjust routing of a data (e.g., VoIP) communication for a client account by generating client-specific sets of control data to the data-communications server 110.

Different embodiments can implement the client-specific control engines 112 in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client (e.g., server/database 101). Similarly, the control directives can be stored locally within the client-specific control engines, or stored remotely (e.g., in a centralized database, in a database maintained by the client or a combination thereof).

In various embodiments, the data-communications system can track a variety of parameters and/or metrics related to calls made or received by the agents of a client entity via processing circuitry 106 that is communicatively coupled to the data-communications server 110. Although the processing circuitry 106 is illustrated as a component of the data-communications server 110, embodiments are not so limited and the processing circuitry can form part of or be separate from the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

The data-communications server 110 interfaces with the plurality of remotely-situated client entities to provide data communications services. As illustrated in the lower portion of FIG. 1, various example embodiments can include a data-communications server 110 having or otherwise being in communication with a plurality of modules and circuitry (e.g., sets of task-specific CPU instructions). Each client entity that is communicatively coupled to the data-communications server 110 can access data and/or services provided by the data-communications server 110. The system (via the data-communications server 110) can include a provider-side client module 102 and processing circuitry 106 that includes analytics circuitry 103 and feedback circuitry 104, among other components. In specific embodiments, data-communications server 110 can capture and analyze digital voice data from spoken conversations between agents of the client entity and customers. The spoken conversations can be transcribed from audio to digital voice data by the data-communications server 110, the endpoint device of the agent via a client on the endpoint device, and/or client data-communications server. The transcription of the spoken audio words to digital voice data can occur via a variety of methods.

As may be appreciated by one of ordinary skill in the art, audio can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference for their teachings.

As illustrated, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side communicating with a VCC web client and a client on the server side (e.g., the provider-side client 102) and provides the digital voice data to the processing circuitry 106. In other embodiments, the agent-side client communicates the digital voice data to the provider-side client 102. The provider-side client 102 then provides the digital voice data to the analytics circuitry 103 for identification of keywords and/or speech characteristic parameters. The identification can include analyzing the digital voice data for matches to keywords and speech characteristic parameters stored in an archive and/or database 101. The database 101 can include a relational database management system (RDMS) which stores data securely and returns the data in response to requests from other applications, as implemented by a database management server, and which can temporarily store data in cache 105.

The stored keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 103 and the provider database 101 can identify a speech characteristic parameter is outside of a threshold value (e.g., indicates problem), and which can be indicative of a tone of sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific agent. For example, if the agent's speech is faster and louder than their baseline, it can be indicative of an issue in the conversation.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

Figure 2:
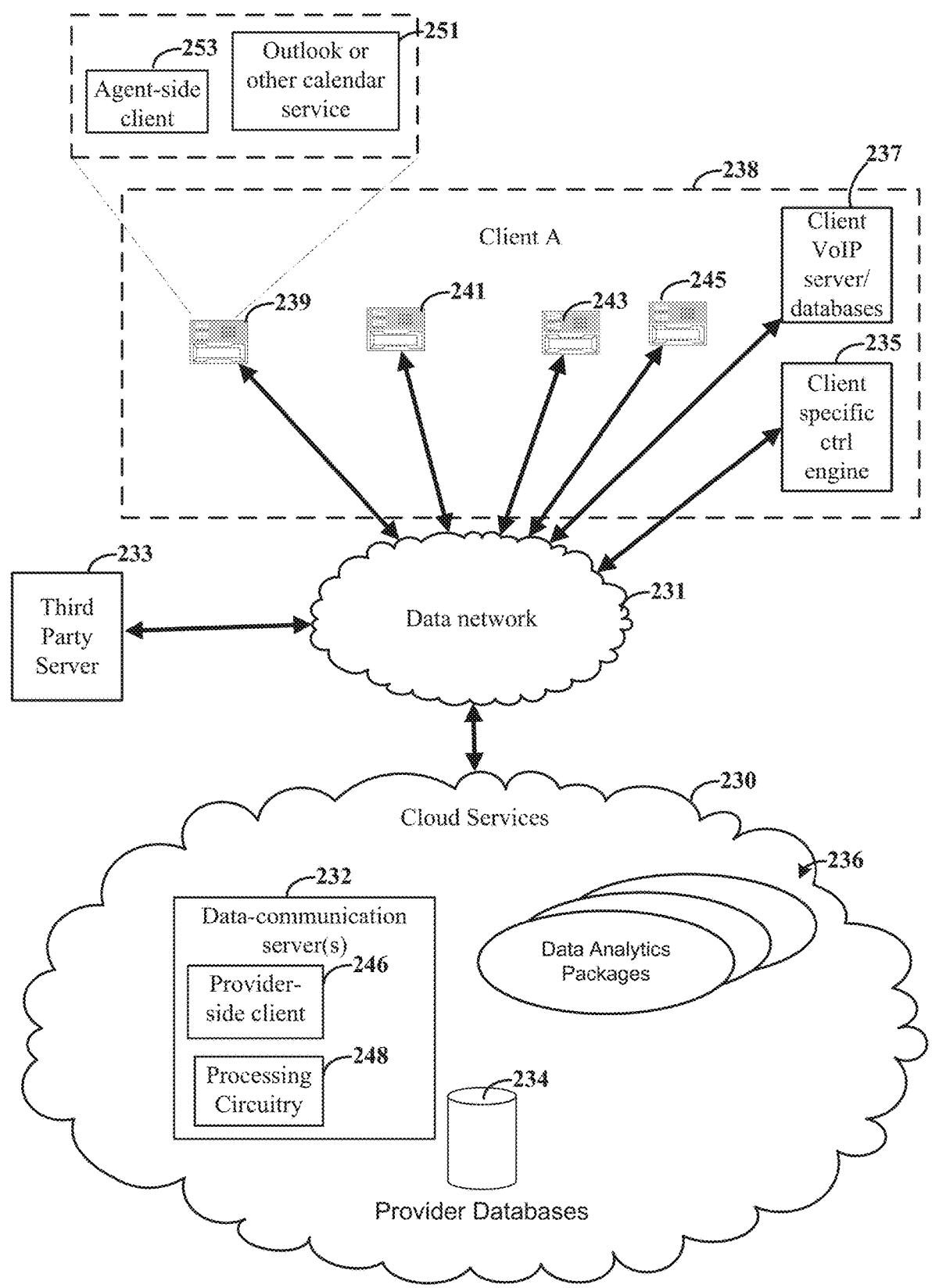
FIG. 2 illustrates an example data-communications system, consistent with embodiments of the present disclosure.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein FIG. 2 illustrates an example data-communications system, in accordance with various embodiments. In connection with the specifically-illustrated example, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The data (e.g., call) routing and other services for the VoIP telephone calls can be provided by one or more data-communications servers 232 within a cloud services system 230 (e.g., configured to provide a PaaS to customers of the VoIP provider). In particular example embodiments, the data-communications servers 232 can be located within platform as a service (PaaS) computing servers, which are part of the cloud services system 230. The cloud services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server can be designed to receive digital voice data, such as directly from an agent-side client associated with particular endpoint devices. The agent-side client can communicate the audio or the digital voice data to the provider-side client. The provider-side client then provides the audio or digital voice data to processing circuitry (e.g., processing circuitry 248, although embodiments are not so limited and can include processing circuitry external to the data-communications server) for further analysis, such as transcribing to digital voice data, identifying keywords and/or speech characteristic parameters, identifying an outcome, and providing an association between the keywords and/or speech characteristic parameter using the identified outcome. The association can be stored in an archive in a provider-side database 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a customer database 237. The feedback can be provided in real time or near real time to the endpoint device of the agent and/or can be accessed by a manager.

Consistent with certain embodiments, the data-communications server 232 can be configured to interface with a third party server 233 such as a customer server, or other third party servers. For instance, a CPXML document stored by the data network 231 can identify, based upon a received call, a Uniform Resource Identifier (URI) that points to customer servers, or to other third party servers.

The one or more data-communications servers 232 monitor and analyze call data relating to digital call data of calls occurring using the VoIP endpoint devices 239, 241, 243, 245 can further analyze such assessment for different customers over many entities and can provide the same as data analytic packages 236 via the processing circuitry 248. The packages 236 can be provided as a service to entities and can be based on geographic regions, markets, and type of customers. In specific embodiments, the packages 236 can be provided as a service and can be used for training agents for providing better customer interactions, such as suggested phrasing and words that result in particular outcomes and/or outcomes that are efficient. The packages 236 can be based on various customer-interaction metrics used to analyze the quality of calls.

As an example, the data analytics packages 236 can be offered as a cloud-based service to an entity to use for training purposes and/or otherwise improve or monitor customer interactions by agents. In some instances, the cloud based services can include automatic antitrust blockers. For example, the data service provider can have data blockers which can automatically block particular data provides as part of the data analytics packages 236 to particular entities based on antitrust concerns or privacy for other entities. Example feedback can include outputting a phrase to say during a live audio conversation to an endpoint device currently in use by the agent for the live audio conversation between the agent and the customer, outputting the phrase provided as data for display on user display of the endpoint device and/or audio provided to a speaker of the endpoint device, a customer feedback report using the associations indicative negative and positive outcomes and associated keywords and/or speech characteristic parameters associations.

In various embodiments, the data-communication system can be illustrated by FIG. 1, and/or FIG. 2 can be used to make data (e.g., call) routing decisions based on data across a variety of platforms. The routing decisions, in some specific embodiments, are based on a predicted inability to handle a volume of incoming data communications, such as calls, although embodiments are not so limited and can include rerouting responsive to other indications (such as region or branch of a client entity having negative customer interactions or other rational). The decision can be made based on data obtained from endpoint devices of agents, data-communications server(s) operated by the provider, and/or data-communications server operated by the client. In some embodiments, the prediction can be based on geography, system updates, schedules and keywords, and which include unification between platforms of the data-communications system to provide better routing decisions. In a number of embodiments, the call traffic can be rerouted based on analysis of digital voice data.

The unification can include the use of Outlook on the agent's endpoint device(s) to identify schedules, data from the client data-communication (e.g., VoIP) server to identify scheduled system updates and/or other system level issues, and digital voice data analyzed to identify when to reroute traffic, as well as other data such as data obtained from a search engine. The digital voice data may be used to identify an agent that is leaving when not scheduled to, or that may be otherwise unable to take telephone calls. As an example, one or more agents may unexpectantly be unable to answer phone calls due to illness, weather or other catastrophes of the geographic region, family issues, unplanned work meetings, among other reasons. In some specific embodiments, an event can occur that may impact a variety of agents located at different geographic locations. The unification of the different platforms can be used to identify patterns, such as particular events that different classification of agents (e.g., age, sex, geography, and other demographics) are more likely to be impacted by. As a specific example, agents that are between the ages of 18-25 may be more likely to ask for vacation time during the spring (e.g., Spring break). Additionally, agents that are known to have children may be more likely to ask for vacation time during Spring break of their children's school. As another specific example, patterns of a specific agent may be identified, such as common vacation requests (e.g., after or before a particular sports team has a game, during a political campaign, specific religious holidays, weather etc.)

Such situations may be identified based on keywords and may be associated with being out of the office or unable to answer calls (as an outcome in the archive). In addition to using the digital voice data to predict volume of calls that can be handled, the digital voice data can be used to make decisions of where to reroute the calls to. For example, calls can be rerouted to a region with similar types of keywords or speech characteristics and/or to particular agents that have experiences with the same type of customers.

In specific embodiment, the analysis can include artificial intelligence used to predict a call answer rate of an entity and/or specific regions of the entity. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

As described above, the data-communications system illustrated by FIG. 2 can be used to predict an ability to handle call volume, in accordance with various embodiments. The routing decisions can be made by one or more of the data-communications servers 232 based on a prediction of call volume that can be handled by agents of the entity. The predicted call volume can be determined using processing circuitry 248 and based on integration of data across a plurality of platforms, such as agent's machines (Outlook 651 to identify schedules), client data-communications server 237 (identify updates on server/system or other system level issues), and provider data-communications server 232 (including the previously described digital voice data and analytics of data to identify/predict when calls cannot be made), as well as other sources (e.g., Internet-based data). The processing circuitry 248 can analyze data identifying schedules of agents, updates to the server or system, system level issues, and predictions of when agents may be available and/or how long calls may take based on archived data stored in the provider databases 234.

As previously described, the one or more data-communications servers 232 can monitor and analyze call data relating to digital call data of calls occurring using the endpoint devices 239, 241, 243, 245 and the processing circuitry 238. For example, a data-communications servers 232 can be designed to receive digital voice data, such as directly from an agent-side client (e.g., agent-side client 253) associated with particular endpoint devices and provide the same to the processing circuitry 248. The processing circuitry 248, although illustrated as a component of the data-communications server 232, can be external to the server 232 in various embodiments. The agent-side client 253 can communicate the audio or the digital voice data to the provider-side client 246. The provider-side client 246 then provides the audio or digital voice data to the processing circuitry 248 for further analysis, such as transcribing to digital voice data, identifying keywords and/or speech characteristic parameters, identifying an outcome, and providing an association between the keywords and/or speech characteristic parameter using the identified outcome. The association can be stored in an archive in a provider-side database 234. In some instances, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server 232 to provide a new association and/or update an existing association. The script can use the information to generate a report that can be used for training, promotions, and other analysis of agents. According to various embodiments, the database queries could be sent to a customer database and/or another third party server 233. The feedback can be provided in real time or near real time to the endpoint device of the agent and/or can be accessed by a manager.

In some instances, the analysis by the processing circuitry 248 can include predicting a call volume that can be handled by various agents and which can be used for routing decisions. The call volume predicted can be based on the data analytics packages 236 and/or archived data in the provided databases 234 such as identification of average call times, which can be different for different types of customers, and for the respective agents, types of calls or customers predicted to be calling (e.g., average for time of year and geographic location as an example), prediction of system level issues and predicted agents that are available to receive calls. The prediction of agents can be based on data from the agent's machine(s), such as Outlook or other calendar services or applications 251, or within the database 234 or as part of a data analytics package 236. For example, the digital voice data from a particular agent may include identification of a time the agent will not be available (has another call, a meeting, etc.). As another example, the data analytics package 236 may include identification of types of agents that may be unavailable in response to different events or times of the year (e.g., Spring break time, particular holidays, sporting events, natural disasters etc.) and/or based on general trends across the entity and/or a particular region of the entity.

Additionally, decisions on where to reroute the calls to can be based on the previously described data analytics. For example, customers from the Southern region of the United States may respond better to different speech characteristics than customers from the Northeast region of the United States. Such associations may be determined over time and using the database 234 to capture the digital voice data associations, and may be across different entities, and can be used to make decisions on where to reroute calls to. Such rerouting decision may be performed with or without the call volume predictions.

In response to a client not having such a service, the processing circuitry 248 can predict a call volume that can be handled is less than a predicted incoming call volume and communicate the same to the data-communications server 232. The data-communications server 232 can offer the rerouting as a service to the client.

Figure 3:
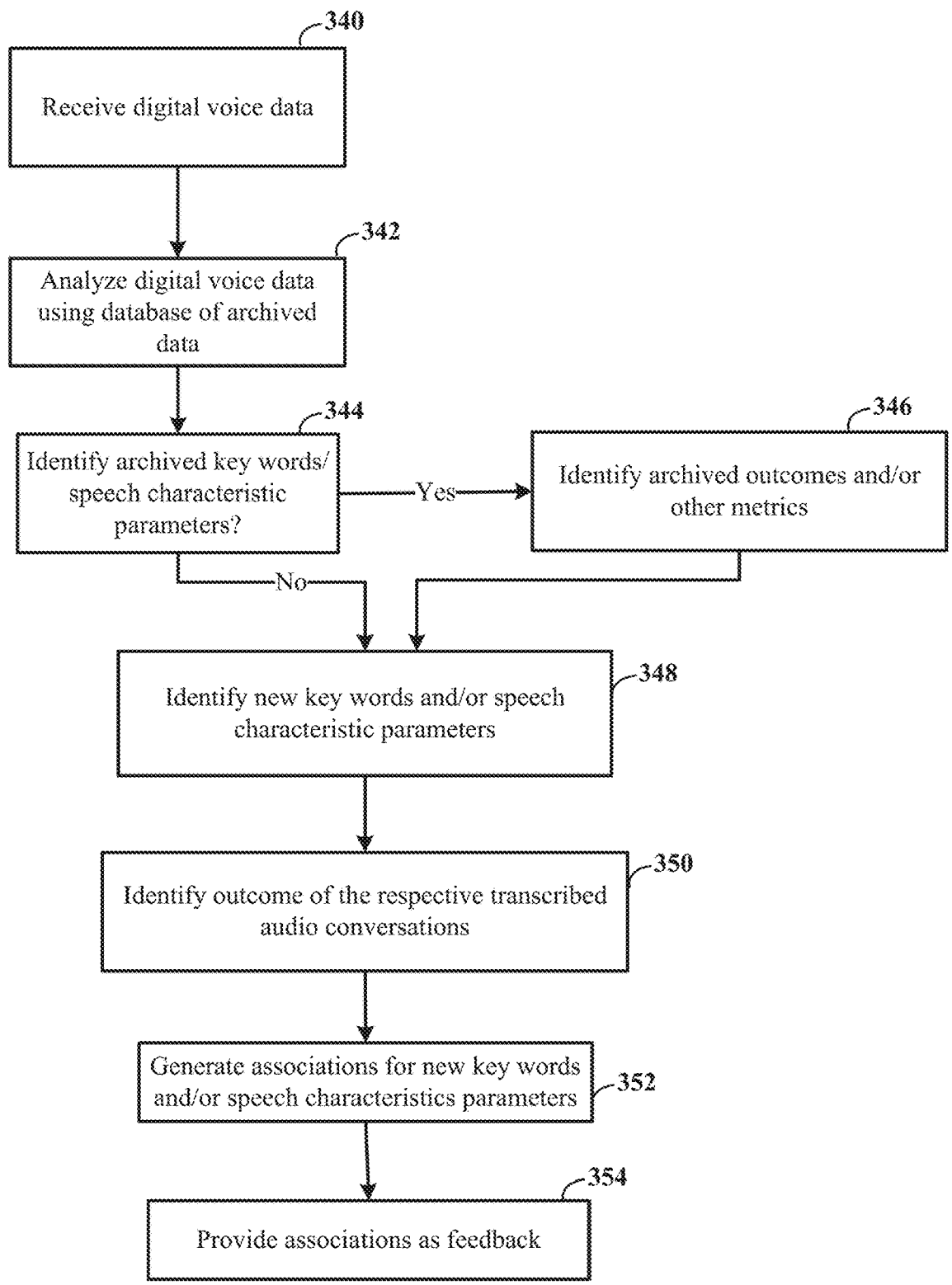
FIG. 3 illustrates an example method for use in a data-communications system, consistent with embodiments of the present disclosure.

FIG. 3 illustrates an example method for use in a data-communications apparatus, in accordance with various embodiments. The method can be used for analyzing digital voice data and providing feedback as a service.

At 340, the method includes receiving, at processing circuitry in communication with a data-communications server, digital voice data indicative of transcribed audio conversations between a plurality of agents and customers of a remotely-situated client entity. The digital voice data can be transcribed from audio by the endpoint device of the agents and communicated to the processing circuitry and/or the data-communications server via clients on the agent and provide side. In other embodiments, a client server can transcribe the digital voice data and communicate the same to the data-communications server and/or the data-communications server can transcribe communicated audio waves.

At 342, the digital voice data can be analyzed, via the processing circuitry, using a database, such as a database of archived data including associations of keywords and/or speech characteristic parameters and outcomes. The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client data-communications server as feedback on audio conversations with the customers.

For example, at 344, the digital voice data is analyzed and used to identify keywords and speech characteristic parameters of the digital voice data and compare the identified keywords and parameters to a database. The database has stored correlations or associations of keywords and parameters to tones or sentiments of a conversation and outcomes of the conversations. The associations or correlations can include a probability of the match indicating the outcome. In response to a match, at 346, the correlated archived outcomes is identified. In response to no match and/or in addition (can have matching and nonmatching keywords), at 348, new keywords can be identified. At 350, the outcome of the respective transcribed audio conversation can be identified. The outcome can be identified based on a match and a respective correlation and/or based on analysis of metadata in the digital voice data. In some embodiments, an agent can enter metadata that is correlated with the digital voice data and/or that otherwise ties to the transcript. The metadata can identify the outcome.

The use of the archived database, in various embodiments, can include performing artificial intelligence to determine the outcome. The processing circuitry and/or data-communications server can analyze patterns to identify and associate different keywords, phrases, and/or speech characteristic parameters with particular outcomes, and which can be different for different types of customers (e.g., different geographic regions, fields, sexes, ages, and other categorizations). The processing circuitry and/or data-communications server can analyze resulting data to determine the outcome, such as identifying a sale, retention of a customer, hang-up, loss of a customer, resolution of a problem, which can include a specific and identified problem or a general problem, among other outcomes. Overtime, the processing circuitry and/or data-communications server can update the database based on additional digital voice data. For example, at 352, the method includes generating associations with at least one of the keywords and speech characteristic parameters with the identified outcomes. The associations can include new keywords that are associated with particular outcomes, new outcomes, and increasing or decreasing a correlation of keywords or parameters with an outcome. For more general information on artificial intelligence and specific information on achieving artificial intelligence, reference to made to U.S. Publication No. 2004/0143559, filed on Jan. 13, 2004, entitled "System and Method for Developing Artificial Intelligence," and U.S. Pat. No. 5,473,732 filed on Feb. 7, 1995, entitled "Relational Artificial Intelligence System," each of which are fully incorporated herein for their teachings.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

As a specific example, and not intended to be limiting, a first region can include a Northeastern region of the United States and a second region can include a Southern region of the United states. It may be identified that customers from the first region speak at a greater frequency and amplitude that customers from the second region. As another example, it may be identified that women speak at a lower amplitude than men. A third region can include Southern Pacific Coast of the United States (e.g., parts of California) which may include customers that speak at a similar frequency and amplitude as customers from the first region. However, embodiments are not so limited and the above is provided only as an illustrative example. Additionally each of the about may have specific words and phrases to avoid, as they have a greater probability then other words at causing a positive or negative outcome. As a specific example, the second region may have a positive outcome associated with calling the customer "Miss" or "Mr." whereas customers from the third region may have negative outcome associated with the same or may have a greater probability of a positive outcome when addressing customers by their first name.

In various embodiments, feedback can be provided. For example, at 354, the method further includes providing the associations to a client data-communications server as feedback on audio conversations with the customers. The feedback can be provided to the agent in real time and used by the agent to assist in achieving a positive outcome or to otherwise adjust an outcome of the conversation. In other embodiments, the feedback can be provided after the call is finished and used to train the user. For example, the feedback can be used to train the user in how to handle different situations. In some instances, a report is generated that can be reviewed by a manager, as previous described. Further, in specific embodiments, a manager can be automatically bridged into a VoIP call responsive to particular keywords (e.g., swearing), based on the specific customer, and/or speech characteristics parameters outside a threshold. In such a manner, the feedback can include or otherwise be indicative of customer feedback which is provided to the client entity without actively querying the customer, such as with the customer actively providing answers to a questionnaire.

In a number of related embodiments, the associations between keywords and/or speech characteristic parameters can be adjusted over time. The adjustment can be responsive to different outcomes or input from the agent or other users. For example, the processing circuitry can provide a respective association with at least one of the keywords and speech characteristics with the identified outcome to an agent associated with the audio conversation or a manager associated with the agent. In a number of embodiments, the associations can be locked and a manager reviews the recommended adjustments (by the agent) and approves or denies the adjustment. In response to the agent or manager providing an input indicating the associated is incorrect, the association is adjusted. In other embodiments and/or in addition, the association can be stored in response to the agent or manager providing an indication indicating the associated is correct or not providing any indication within a threshold period of time.

Figure 4:
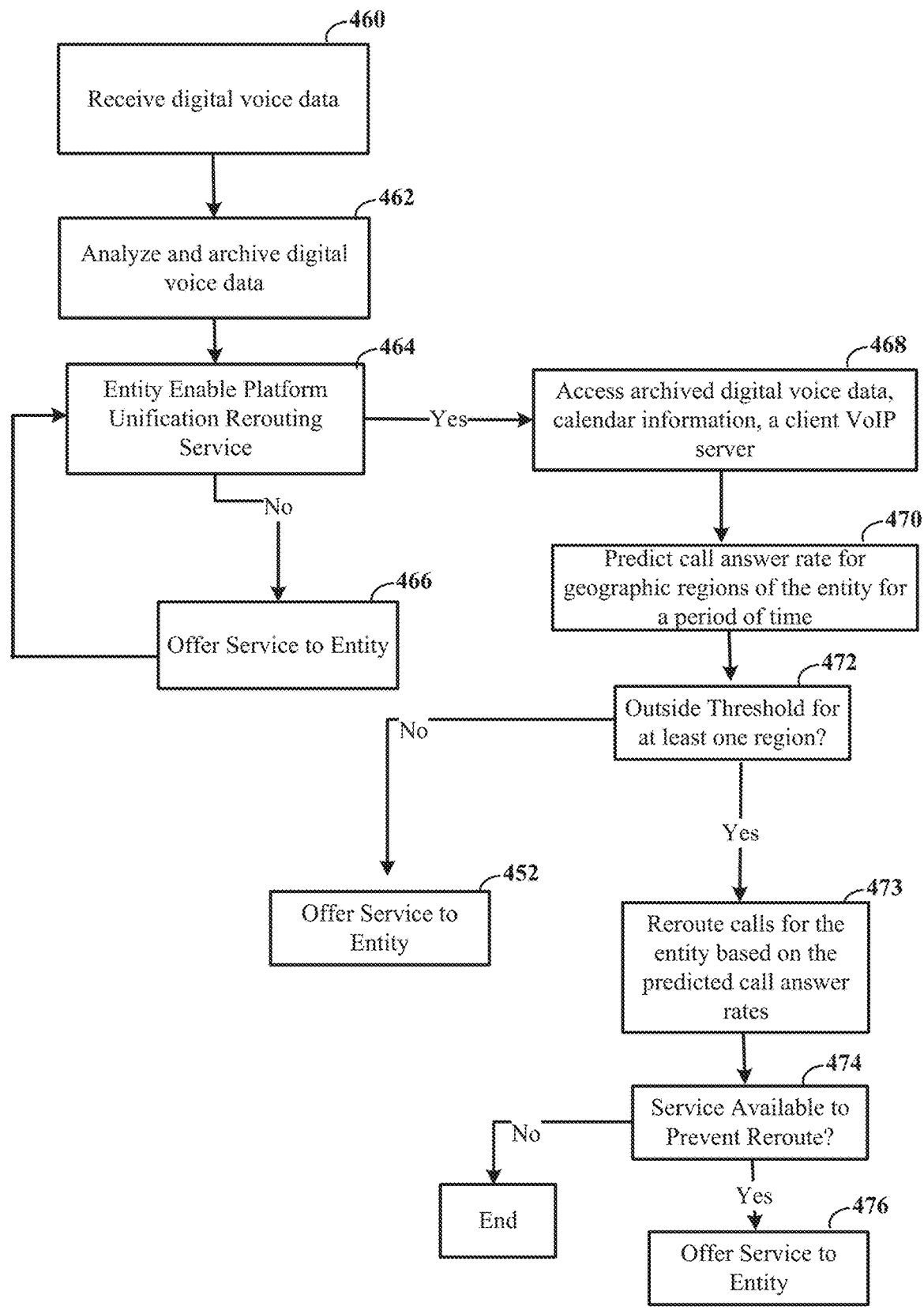
FIG. 4 illustrates an example method for use in a data-communications system, consistent with embodiments of the present disclosure.

FIG. 4 illustrates an example method for use in a data-communications system, in accordance with various embodiments. The method can be used to analyze a predicted call volume that can be handled by an entity and/or a subset of agents of entity and providing rerouting decisions based on the predicted call volume.

The method at 460 can include receiving, at processing circuitry in communication with a data-communications server, digital voice data indicative of transcribed audio conversations between a plurality of agents and customers of at least one of a plurality of remotely-situated client entities. The digital voice data can be transcribed from audio provided by the endpoint device of the agent and communicated to the data-communications server via clients on the agent and provider side. The data-communications server can communicate the digital voice data to the processing circuitry and/or the processing circuitry can otherwise form part of the data-communications server. In other embodiments, a client data-communication server can transcribe the digital voice data and communicate the same to the data-communications server and/or the data-communications server can transcribe communicated audio waves.

At 462, the digital voice data can be analyzed, via the processing circuitry using a database, such as a database of archived data including associations of keywords and/or speech characteristic parameters and outcomes, as previously described The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client server as feedback on audio conversations with the customers.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

At 464, a determination is made as to whether the entity has enabled a platform unification rerouting service. The platform unification rerouting service can include the prediction of the call volume that can be handled (e.g., processed by agents or a subgroup of agents) and rerouting based on the same. The predicted call volume and determination of rerouting can occur via access of a variety of data across multiple platforms. For example, the platforms can include the provider database, the remotely-situation client entities, data analysis package services, a client (VoIP) server, and a third party server, among other resources such as the Internet. In response to determining the client has not enabled the service, the service can be offered to the client at 466.

In response to determining the service is enabled, at 468, the data-communications server can access the other platforms. For example, the data-communications server can access calendar information for agents the least one of the plurality of remotely-situated client entities (e.g., access the endpoint devices for calendar information), and a client (VoIP) server for geographic information of the agents and system parameters of the remotely-situated client entity. Such data can be combined with the archived digital voice data of agents of the entity, as well as other types of data, and analyzed to predict a call answer rate for particular agents of a geographic region of the entity for a period of time, at 470. The predicted call answer rate may be below or above a normal threshold and/or below a predicted call rate (e.g., how many calls will be made that agents are to answer). In other embodiments and/or in addition, during real time, the actual call threshold, e.g., call made to agents in the region, can be greater than the predicted call answer rate. A determination of the above can be made at 472. In response to the predicted (or actual) call answer rate being outside (e.g., greater than) the threshold, the process can end or the processing circuitry and data-communications server may use the data analyzed to offer other services to the entity at 452 such as data analytics packages, feedback on customer interactions.

In some specific embodiments, the processing circuitry can predict (or the actual can be) the call answer rate for particular agents of the geographic location to be below a threshold responsive to identifying greater than a threshold number of agents are out of the office for the period of time, trigger words in the archived digital voice data indicative of illness, weather, catastrophes associated with the geographic region and the period of time, system parameters indicating schedule outages or system updates for the period of time, and/or indications of a likely increase in calls (e.g., weather events may indicate increase calls for an automobile and home insurance company). For example, the processing circuitry can predict the call answer rate for particular agents by weighing each of the information identified from the archived digital voice data, the calendar information, and the system parameters.

As a specific example, the processing circuitry can predict the call answer rate for particular agents of the geographic location to be outside threshold responsive to identifying less than a threshold number of agents are out of the office for the period of time, trigger words in the archived digital voice data indicative of increased productivity during the period of time; and/or system parameters indicating increased productivity for the period of time. In some embodiments, an increasing number of incoming calls can be rerouting to the geographic region in response to the prediction. For example, the analysis may indicate that the particular agents can handle a higher volume of calls than are being routed. In other instances, the analysis may identify that the particular agents can handle a lower volume of calls than are being routed.

As another specific example, the processing circuitry can analyze the archive of digital voice data indicative of transcribed audio conversations between the plurality of agents and customers to identify keywords and speech characteristic parameters associated with the customers and the outcomes of the transcribed audio conversations. The server can predict the call answer rate for particular agents of the geographic region based on identified keywords and outcomes of the transcribed audio calls associated with the particular agents (e.g., have better success, can have better outcomes for particular customers). The processing circuitry can also provide a weight of the identified information and sum the weights, wherein a respective summed weights outside a threshold indicates rerouting of calls for the respective geographic region.

In response to the predicted call answer rate for particular agents of a geographic region of the remotely-situated client entity for a period of time being outside a threshold, such as being less than an actual call in rate or a predicted time for answer calls in the period of time, at 473, the calls can be rerouted, by the data-communications server, for the remotely-situated client entity based on the predicted call answer rate. The rerouting of the incoming calls can further include providing an indication of the rerouting to an identified personnel of the client entity as identified from the client data-communications server, and rerouting in response to verification received from the identified personnel (allow for feedback/don't auto reroute).

In some embodiments, the processing circuitry can identify if there is a service available to prevent the rerouting in the future for the client at 474. Such a service can include additional server resources, server updates, etc. In response to determining a service is available, at 476, the service is offered to the client. If no service is available, the process can end. As a specific example, feedback can be provided to an identified personnel responsive to the rerouting, the feedback including a service provided by the data-communications server that increases a call rate of the geographic region (e.g., provide backup server that would have prevented a decrease in call rate).

Although the above embodiments in connection with the figures, describe an intelligent rerouting responsive to predicted call rate, embodiments are not so limited. For example, various embodiment include rerouting calls based on the analytics that is independent of a predicted call rate.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Various embodiments are implemented in accordance with the underlying Provisional Application (Ser. No. 62/650,652), entitled "Analysis of Digital Voice Data in a Data-Communication Server System," filed Mar. 30, 2018, to which benefit is claimed and which are fully incorporated herein by reference. For instance, embodiments herein and/or in the provisional application may be combined in varying degrees (including wholly). Reference may also be made to the teachings and underlying references provided in the underlying provisional application. Embodiments discussed in the slides are not intended, in any way, to be limiting to the overall technical disclosure, or to any part of the claimed invention unless specifically noted.

Similarly, it will be apparent that a server includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (VoIP) endpoint device (or endpoint) includes a communication circuit and (computer) processing circuits which are configured to establish (VoIP) communication sessions with other endpoint devices. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or datacenter communications server. Further, a data-center communications server or data-communications server refers to or includes a computer processing circuit that is configured to provide data-communications services to other circuit-based devices. In certain embodiments, a processing circuit or circuitry, as provided above, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed:

1. A data-communication system, the system comprising:
    a data-communications computer server to interface with a plurality of remotely-situated client entities and to provide data communications services to or on behalf of the plurality of remotely-situated client entities, wherein each of the plurality of remotely-situated client entities corresponds to a user or a group of users of certain of the data communications services; and
    processing circuitry communicatively coupled to a memory circuit and to the data-communications computer server, wherein for each of the plurality of remotely-situated client entities, the processing circuitry is to use digital voice data associated with transcribed audio conversations involving or associated with respective ones of the plurality of remotely-situated client entities and to use calendar information provided by or associated with the respective ones of the plurality of remotely-situated client entities, the digital voice data including keywords and speech characteristic parameters associated with outcomes of or with contexts relating to the transcribed audio conversations; and
    at least one computer server, communicatively coupled to the data-communications computer server, to process the calendar information and geographic information associated with agents of the plurality of remotely-situated client entities and to assess the digital voice data associated with the agents thereof, to:
        predict call answer rates associated with certain geographic regions using the digital voice data associated with the agents; and
        reroute incoming calls based on the predicted call answer rate.

2. The data-communication system of claim 1, wherein the processing circuitry is configured to predict the call answer rates for particular agents of the geographic regions relative to a threshold indicative of numbers of agents out of the office for specified periods of time.

3. The data-communication system of claim 1, wherein the processing circuitry is configured to predict the call answer rates for particular agents of the geographic regions relative to a threshold indicative of trigger words among or associated with the digital voice data indicative of events associated with the geographic regions and for specified periods of time.

4. The data-communication system of claim 1, wherein the processing circuitry is configured to predict the call answer rates for particular agents of the geographic regions relative to a threshold indicative of communication system parameters relating to outages or communication system updates for specified periods of time.

5. The data-communication system of claim 1, wherein the processing circuitry is to predict the call answer rate for particular agents by weighting data associated with each of: information identified from the digital voice data; and the calendar information.

6. The data-communication system of claim 1, wherein the processing circuitry and the data-communications computer server are to reroute the incoming calls by providing an indication of the rerouting to an identified personnel of the client entity as identified from the at least one computer server, and by rerouting the incoming calls in response to verification received from personnel associated with respective ones of the plurality of remotely-situated client entities.

7. The data-communication system of claim 6, wherein the processing circuitry is to provide feedback to an identified one of the personnel responsive to the rerouting, wherein the feedback includes a service provided by the data-communications computer server that increases a call rate of the geographic regions.

8. The data-communication system of claim 1, wherein the processing circuitry is to predict the call answer rates for particular agents of certain of the geographic regions in response to notification that less than a threshold number of agents are out of the office for specified periods of time.

9. The data-communication system of claim 1, wherein the processing circuitry is to predict the call answer rates for particular agents of certain of the geographic regions in response to notification of use of trigger words in the digital voice data which are indicative of increased productivity.

10. The data-communication system of claim 1, wherein the processing circuitry is to predict the call answer rates for particular agents of certain of the geographic regions in response to notification of system parameters indicating increased productivity.

11. The data-communication system of claim 1, wherein the processing circuitry is configured to reroute an increasing number of incoming calls to the geographic regions in response to the prediction of call answer rates associated with certain geographic regions.

12. The data-communication system of claim 1, wherein the processing circuitry is to identify keywords and speech characteristic parameters associated with customers and the outcomes of or with contexts relating to the transcribed audio conversations, and to predict the call answer rates for particular agents of the geographic regions based on any one or a combination of any of the following: the identified keywords, the speech characteristic parameters, the contexts and/or the outcomes.

13. The data-communication system of claim 1, wherein the processing circuitry is to identify keywords and speech characteristic parameters associated with customers and the outcomes of or with contexts relating to the transcribed audio conversations, and to predict the call answer rates for particular agents of the geographic regions based on a plurality of the following: the identified keywords, the speech characteristic parameters, the contexts and/or the outcomes.

14. The data-communication system of claim 1, wherein the processing circuitry is configured to provide a weight to data used for rerouting of calls for the respective geographic regions.

15. A method carried out using a data-communication system having a data-communications computer server and processing circuitry, the method comprising:

interfacing, via the data-communications computer server, with a plurality of remotely-situated client entities and to provide data communications services to or on behalf of the plurality of remotely-situated client entities, wherein each of the plurality of remotely-situated client entities corresponds to a user or a group of users of certain of the data communications services; and communicatively coupling, via the processing circuitry, to a memory circuit and to the data-communications computer server, wherein for each of the plurality of remotely-situated client entities, the processing circuitry uses digital voice data associated with transcribed audio conversations involving or associated with respective ones of the plurality of remotely-situated client entities and uses calendar information provided by or associated with the respective ones of the plurality of remotely-situated client entities, the digital voice data including keywords and speech characteristic parameters associated with outcomes of or with contexts relating to the transcribed audio conversations; and, communicatively coupling to the data-communications computer server, to process the calendar information and geographic information associated with agents of the plurality of remotely-situated client entities and to assess the digital voice data associated with the agents thereof, to:
  predict call answer rates associated with certain geographic regions using the digital voice data associated with the agents; and
  reroute incoming calls based on the predicted call answer rate.

16. The method of claim 15, wherein the processing circuitry predicts the call answer rates for particular agents of the geographic regions relative to a threshold indicative of numbers of agents out of the office for specified periods of time.

17. The method of claim 15, wherein the processing circuitry predicts the call answer rates for particular agents of the geographic regions relative to a threshold indicative of trigger words among or associated with the digital voice data indicative of events associated with the geographic regions and for specified periods of time.

18. The method of claim 15, wherein the processing circuitry predicts the call answer rates for particular agents of the geographic regions relative to a threshold indicative of communication system parameters relating to outages or communication system updates for specified periods of time.

19. The method of claim 15, wherein the processing circuitry predicts the call answer rate for particular agents by weighting data associated with each of: information identified from the digital voice data; and the calendar information.

20. The method of claim 15, wherein the processing circuitry and the data-communications computer server are used to reroute the incoming calls by providing an indication of the rerouting to an identified personnel of the client entity as identified from the data-communication server and by rerouting the incoming calls in response to verification received from personnel associated with respective ones of the plurality of remotely-situated client entities.

21. The method of claim 15, wherein the processing circuitry and the data-communications computer server are used: to reroute the incoming calls by providing an indication of the rerouting to an identified personnel of the client entity as identified from the data-communication system and by rerouting the incoming calls in response to verification received from personnel associated with respective ones of the plurality of remotely-situated client entities; and to provide feedback to an identified one of the personnel responsive to the rerouting, wherein the feedback includes a service provided by the data-communications computer server that increases a call rate of the geographic regions.

22. The method of claim 15, wherein the processing circuitry predicts the call answer rates for particular agents of certain of the geographic regions in response to notification that less than a threshold number of agents are out of the office for specified periods of time.

23. The method of claim 15, wherein the processing circuitry predicts the call answer rates for particular agents of certain of the geographic regions in response to notification of use of trigger words in the digital voice data which are indicative of increased productivity.

24. The method of claim 15, wherein the processing circuitry predicts the call answer rates for particular agents of certain of the geographic regions in response to notification of system parameters indicating increased productivity.

25. The method of claim 15, wherein the processing circuitry reroutes an increasing number of incoming calls to the geographic regions in response to the prediction of call answer rates associated with certain geographic regions.

26. The method of claim 15, wherein the processing circuitry identifies keywords and speech characteristic parameters associated with customers and the outcomes of or with contexts relating to the transcribed audio conversations, and to predict the call answer rates for particular agents of the geographic regions based on any one or a combination of any of the following: the identified keywords, the speech characteristic parameters, the contexts and/or the outcomes.

27. The method of claim 15, wherein the processing circuitry identifies keywords and speech characteristic parameters associated with customers and the outcomes of or with contexts relating to the transcribed audio conversations, and to predict the call answer rates for particular agents of the geographic regions based on a plurality of the following: the identified keywords, the speech characteristic parameters, the contexts and/or the outcomes.

28. The method of claim 15, wherein the processing circuitry provides a weight to data used for rerouting of calls for the respective geographic regions.

* * * * *